(12) United States Patent
Inoue

(10) Patent No.: US 9,426,327 B2
(45) Date of Patent: Aug. 23, 2016

(54) IMAGE FORMING APPARATUS CAPABLE OF CONTROLLING FILE TRANSMISSION, CONTROL METHOD THEREFOR, AND STORAGE MEDIUM

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/102,642

(22) Filed: Dec. 11, 2013

(65) Prior Publication Data

US 2014/0161239 A1 Jun. 12, 2014

(30) Foreign Application Priority Data

Dec. 11, 2012 (JP) .................................. 2012-270260

(51) Int. Cl.
*H04M 11/00* (2006.01)
*H04N 1/32* (2006.01)

(52) U.S. Cl.
CPC ......... *H04N 1/32058* (2013.01); *H04N 1/3209* (2013.01); *H04N 1/32117* (2013.01); *H04N 2201/0015* (2013.01); *H04N 2201/3204* (2013.01); *H04N 2201/3278* (2013.01)

(58) Field of Classification Search
None
See application file for complete search history.

(56) References Cited

U.S. PATENT DOCUMENTS

| 7,283,273 | B2 | 10/2007 | Izumi et al. | |
| 7,978,832 | B2 * | 7/2011 | Izumi | 379/100.15 |

(Continued)

FOREIGN PATENT DOCUMENTS

| CN | 1734413 A | 2/2006 |
| CN | 1744648 A | 3/2006 |

(Continued)

OTHER PUBLICATIONS

Office Action issued in CN201310671377.5, mailed Jan. 5, 2016. English translation provided.

(Continued)

*Primary Examiner* — Maria El-Zoobi
(74) *Attorney, Agent, or Firm* — Rossi, Kimms & McDowell LLP

(57) ABSTRACT

An image forming apparatus which enables a user to, even in a case of transmitting image data to the party at the other end of the line who is making a phone call over IP telephony, transmit the image data to the party at the other end of the line by one key operation without inputting an address or searching an address book. When a phone call to an external apparatus to which the image forming apparatus is connected via a network is in progress, a communication with the external apparatus is established. When the communication is established, a response transmitted from the external apparatus is received, and destination information on the external apparatus is obtained from the received response. When the destination information on the external apparatus is obtained, an operation unit for transmitting data to the external apparatus is offered.

25 Claims, 9 Drawing Sheets

(56) References Cited

U.S. PATENT DOCUMENTS

| | | | |
|---|---|---|---|
| 8,725,897 B2 | 5/2014 | Inoue | |
| 2002/0131573 A1* | 9/2002 | Berkley et al. | 379/201.01 |
| 2004/0073709 A1* | 4/2004 | Bloomfield | H04N 1/00209 709/246 |
| 2005/0190402 A1* | 9/2005 | Nakamura | 358/1.15 |
| 2005/0275873 A1* | 12/2005 | Sekiguchi | 358/1.15 |
| 2006/0050303 A1 | 3/2006 | Oomori et al. | |
| 2006/0133841 A1 | 6/2006 | Haga | |
| 2006/0274892 A1* | 12/2006 | Izumi | 379/201.01 |
| 2007/0086061 A1* | 4/2007 | Robbins | 358/400 |
| 2007/0268526 A1* | 11/2007 | Ito | H04N 1/00214 358/403 |
| 2011/0043867 A1* | 2/2011 | Tonegawa | H04N 1/4406 358/442 |
| 2011/0158393 A1* | 6/2011 | Yokokura | 379/93.02 |
| 2011/0271324 A1 | 11/2011 | Ikeda | |
| 2012/0163573 A1* | 6/2012 | Shibata | 379/100.01 |
| 2012/0268797 A1* | 10/2012 | Inoue | H04N 1/33323 358/442 |
| 2013/0027744 A1* | 1/2013 | Takahashi | G06F 3/1204 358/1.15 |
| 2013/0057907 A1* | 3/2013 | Lin | H04N 1/0022 358/1.15 |

FOREIGN PATENT DOCUMENTS

| | | |
|---|---|---|
| CN | 101437100 A | 5/2009 |
| CN | 102238170 A | 11/2011 |
| JP | 2004304711 A | 10/2004 |
| JP | 2006-101484 A | 4/2006 |
| JP | 2007-080035 A | 3/2007 |
| JP | 2008154009 A | 7/2008 |
| JP | 2009171438 A | 7/2009 |

OTHER PUBLICATIONS

Shen, "Design and Implementation of Real-time IP Fax Technology Based on T.38 Gateway", Electronic Sci. & Tech., Oct. 15, 2011, pp. 71-74, vol. 24, No. 10. Cited in NPL 1. English abstract provided.

Zheng, et al., "Design and Implementation of IP Real-time Facsimile Gateway Based on T.38 Standard", Computer Engineering, Jun. 2003, pp. 137-139, vol. 29, No. 10. Cited in NPL 1. English abstract provided.

Zhao, et al., "Difficulty analysis of real-time IP facsimile technology based on 138 protocol", Journal of Shenyang University of Technology, Oct. 2005, pp. 544-546, vol. 27, No. 5. Cited in NPL 1. English abstract provided.

\* cited by examiner

FIG. 8

```
SIP
Status-Line:SIP/2.0 200 OK
  Status Code:200
  Message Header
    Allow:INVITE,ACK,BYE,CANCEL
    Contact:<SIP:192.168.1.1:5060>
    From:<SIP:Username@192.168.1.1>
    To:<SIP:Username@192.168.1.1>
  Message Body
    SDP
      SDP Version(V):0
      Owner(O): 1234 IN IP4 192.168.1.2
      Connection Information(I):IN IP4 192.168.1.2
      E-mail Address(E):Aaa@Aaa.CO.JP
      Media Description(M):Audio 5090 RTP 0
      Media Attribute(A):RTPMAP PCMU/8000
```

IMAGE FORMING APPARATUS CAPABLE OF CONTROLLING FILE TRANSMISSION, CONTROL METHOD THEREFOR, AND STORAGE MEDIUM

BACKGROUND OF THE INVENTION

1. Field of the Invention

The present invention relates to an image forming apparatus, a control method therefor, and a computer-readable storage medium storing a program for implementing the control method, and in particular to control of file transmission to the party at the other end of the line who is carrying out a media communication.

2. Description of the Related Art

As the use of products and the way of dealing with troubles have been becoming increasingly complicated, customers frequency contact a call center of a manufacturer and receive answers to questions. In order to deal properly and speedily with troubles, a remote assistance system including an image forming apparatus and a trouble management server at a call center, which manages error information on the image forming apparatus, has been devised. The remote assistance system is configured such that when a trouble occurs, the image forming apparatus itself provides error information to the trouble management server at the call center (see, for example, Japanese Laid-Open Patent Publication (Kokai) No. 2007-80035).

When an operator receives a trouble call by telephone from a customer, the operator checks trouble information drawn out from the customer with error information managed in the trouble management server, determines a way to deal with the trouble, and answers the customer.

According to Japanese Laid-Open Patent Publication (Kokai) No. 2007-80035, a phone call to the call center is made using an analog telephone line, but a phone call to the call center may be made using IP because IP telephone has been becoming widespread. In this case, no analog line is needed, and IP telephone is typically realized using protocols SIP (Session Initiation Protocol) and RTP (Real-time Transport Protocol).

Examples of inquiries received by the call center include problems of image defects such as print failures and image shifts occurring in the image forming apparatus. When such an image defect problem arises, it is difficult for a customer to verbally tell the call center the details of the defect. Accordingly, a poor image or an image on which device setting information on the image forming apparatus is printed is scanned by the image forming apparatus and transmitted from the image forming apparatus to the call center, and the received image is visually checked at the call center, so that the details can easily be understood.

In order to transmit image data to the call center, however, a user has to input an IP address or an E-mail address of the call center or retrieve an IP address or an E-mail address of the call center from an address book. It is very troublesome for the user to perform such an operation while making a phone call to the call center. Moreover, when the user manually sets an address of the party at the other end of the line, he or she may input a wrong address or transmit image data to a wrong address. As a way to solve the problem of such complicated operations, there has been proposed a technique of transmitting image data to an E-mail address of oneself who has been authenticated and logged in using a one-touch operation key (see, for example, Japanese Laid-Open Patent Publication (Kokai) No. 2006-101484). When a problem arises, however, it is necessary to transmit image data to the party at the other end of the line, and hence the substance of the problem cannot be resolved.

Further, when a user is notified of an IP address or an E-mail address of the call center, there are fears of unauthorized use and leakage of address information on the call center.

SUMMARY OF THE INVENTION

The present invention provides an image forming apparatus and a control method therefor, which enables a user to, even in the case of transmitting image data to the party at the other end of the line who is making a phone call over IP telephony, transmit the image data to the party at the other end of the line by one key operation without inputting an address or searching an address book, as well as a computer-readable storage medium storing a program for implementing the control method.

Accordingly, a first aspect of the present invention provides an image forming apparatus comprising a communication control unit configured to establish a communication with an external apparatus using a call control protocol, an obtaining unit configured to, when the communication control unit establishes the communication, obtain destination information on the external apparatus from the external apparatus, and a display unit configured to, when the obtaining unit obtains the destination information on the external apparatus, display an operation key which enables data transmission to the external apparatus without manual input of the destination information by a user.

Accordingly, a second aspect of the present invention provides a control method for an image forming apparatus, comprising a communication control step of establishing a communication with an external apparatus using a call control protocol, an obtaining step of, when the communication is established in the communication control step, obtaining destination information on the external apparatus from the external apparatus, and a display step of, when the destination information on the external apparatus is obtained in the obtaining step, displaying an operation key which enables data transmission to the external apparatus without manual input of the destination information by a user.

Accordingly, a third aspect of the present invention provides a non-transitory computer-readable storage medium storing a program for causing a computer to execute a control method for an image forming apparatus, the control method comprising a communication control step of establishing a communication with an external apparatus using a call control protocol, an obtaining step of, when the communication is established in the communication control step, obtaining destination information on the external apparatus from the external apparatus, and a display step of, when the destination information on the external apparatus is obtained in the obtaining step, displaying an operation key which enables data transmission to the external apparatus without manual input of the destination information by a user.

According to the present invention, even in the case of transmitting image data to the party at the other end of the line who is making a phone call over IP telephony, a user can transmit the image data to the party at the other end of the line by one key operation without inputting an address or searching an address book.

Further features of the present invention will become apparent from the following description of exemplary embodiments (with reference to the attached drawings).

BRIEF DESCRIPTION OF THE DRAWINGS

FIG. 8 is a view showing an exemplary success response to an Invite request.

DESCRIPTION OF THE EMBODIMENTS

The present invention will now be described in detail with reference to the drawings showing an embodiment thereof.

Figure 1:
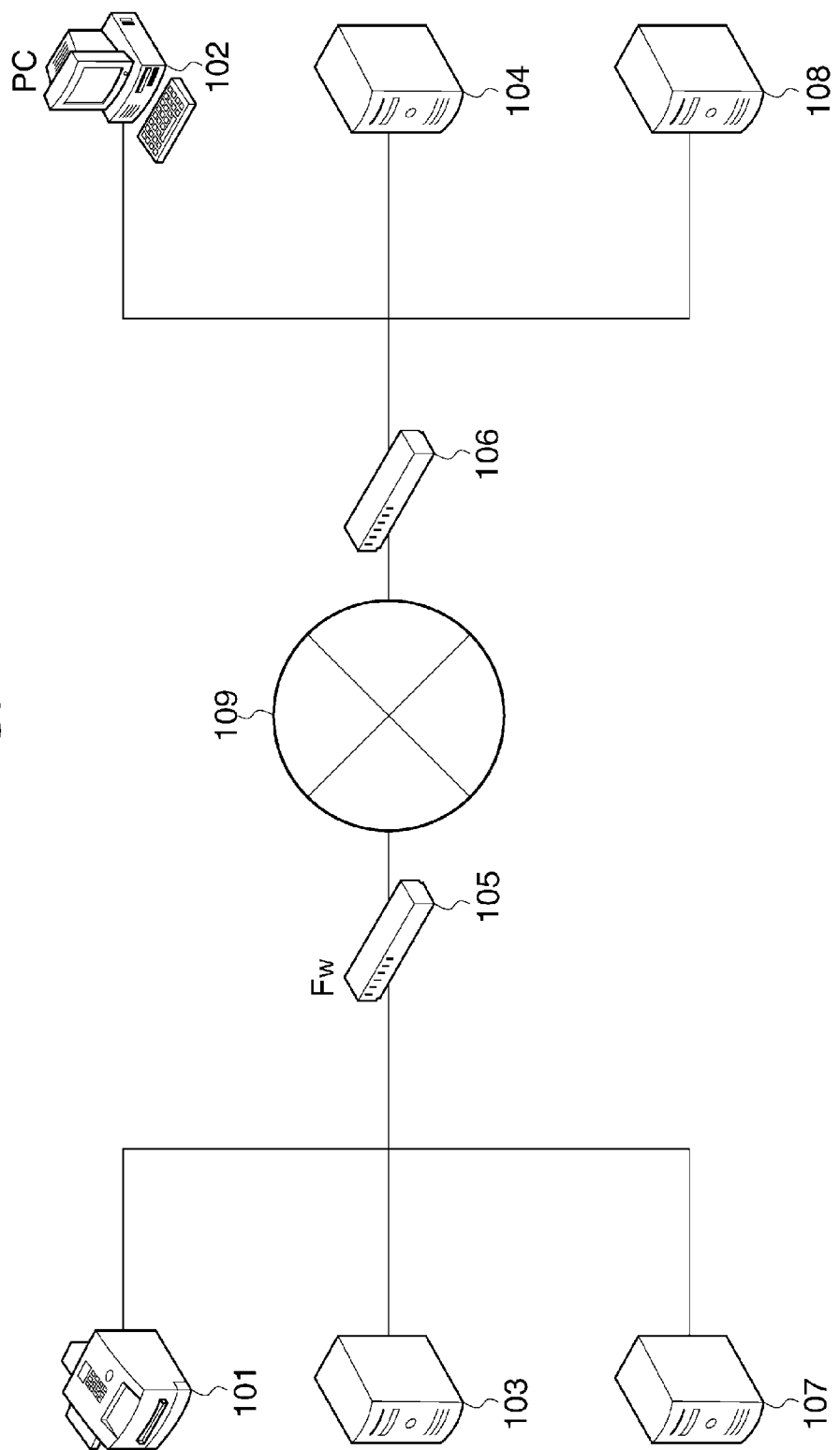
FIG. 1 is a view schematically showing a network arrangement of a remote assistance system having an image forming apparatus according to an embodiment of the present invention.

FIG. 1 is a view schematically showing a network arrangement of a remote assistance system having an image forming apparatus according to an embodiment of the present invention.

Referring to FIG. 1, the image forming apparatus 101 is a multifunctional peripheral which mainly a customer or the like uses. A PC 102 is a personal computer which an operator at a call center uses. Both the image forming apparatus 101 and the PC 102 nave a data communication function of carrying out data communications by performing call control (session control) using SIP (Session Initiation Protocol).

The image forming apparatus 101 and a SIP proxy 103 are connected to a network 109 via a firewall (FW) 105. A SIP proxy 104 and the PC 102 on the call center side are connected to the network 109 via an FW 106.

In call control using SIP, a user agent (UA) which is identified by a SIP URI (Uniform Resource Identifier) is able to carrying out communications with no regard to a device IP address of a data transmission destination. A SIP session is established between UAs by exchanging SIP messages via SIP proxies. In the present embodiment, the image forming apparatus 101 and the PC 102 act as user agents (UA). The SIP proxies 103 and 104 act as SIP proxies.

It should be noted that although in the present embodiment, the UAs exchange SIP messages via the SIP proxies, they may directly exchange SIP messages without involving the SIP proxies. Also, although in the present embodiment, the UAs carry out communications with the network 109 via the FWs 105 and 106, a network may be configured to involve no FWs. Moreover, a larger number of FWs, SIP proxies, image forming apparatuses, and PCs than those shown in the figure may be connected to the network 109. Further, although in the present embodiment, SIP is taken as an example of the call control protocol, the call control protocol should not be limited to SIP. Also, when the image forming apparatus 101 and the PC 102 communicate with each other by E-mail, they carry out communicators via mail servers 107 and 108.

Figure 2:
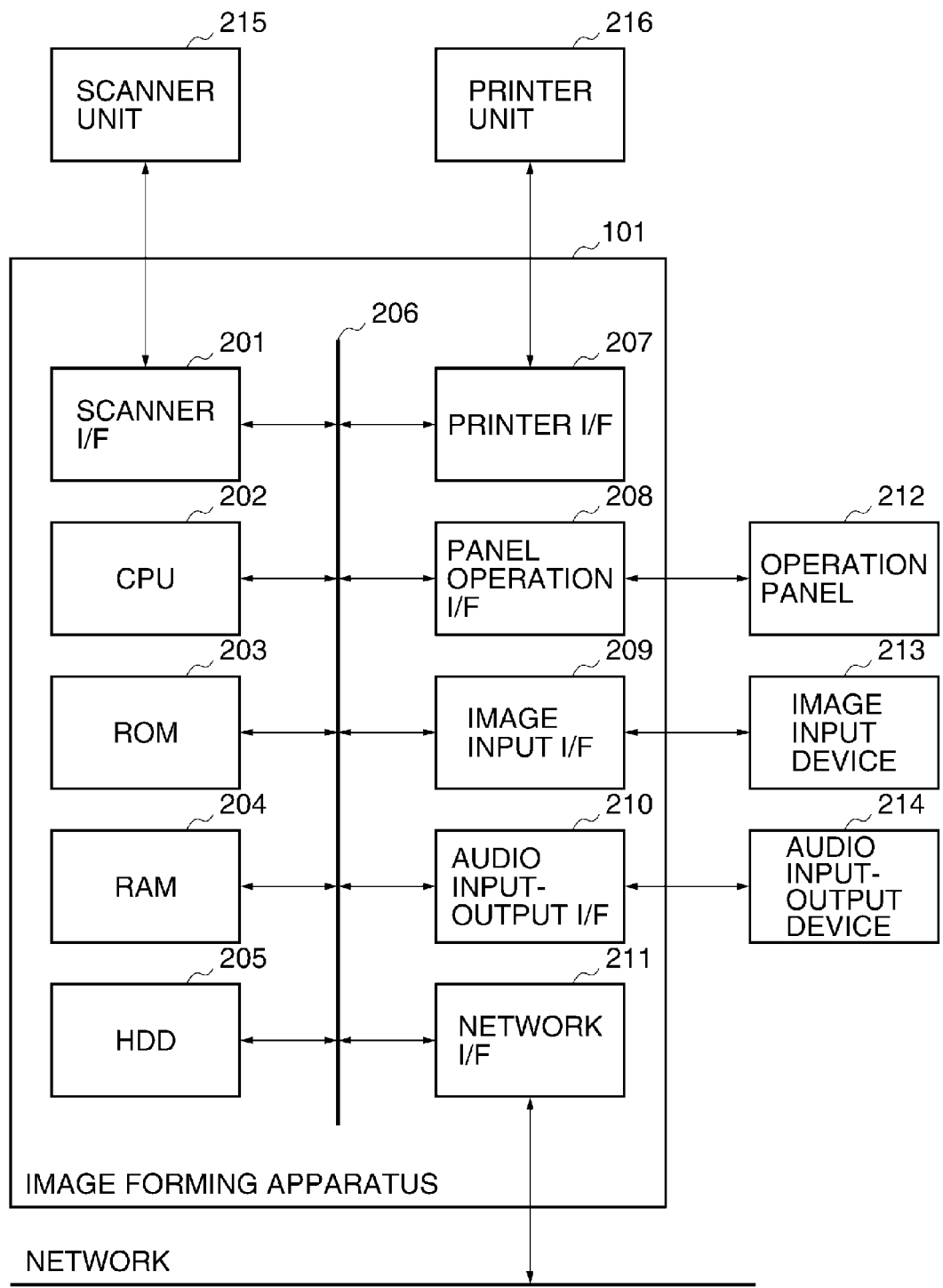
FIG. 2 is a block diagram schematically showing a hardware arrangement of the image forming apparatus appearing in FIG. 1.

FIG. 2 is a block diagram schematically showing a hardware arrangement of the image forming apparatus 101 appearing in FIG. 1.

Referring to FIG. 2, a CPU 202 provides centralized control of various devices, which are connected to a system bus 206, by executing control programs stored in a ROM 203 or a hard disk (HDD) 205. The ROM 203 stores control programs, which are executable by the CPU 202, and others. RAM 204, which acts mainly as main memory, work area, and so on for the CPU 202, is configured to be able to enhance its memory capacity using optional RAM connected to an expansion port, not shown. The HDD 205, which is a hard disk (HDD), stores a boot program, various applications, font data, user files, edit files, and so on. It should be noted that although in the present embodiment, the HDD 205 is used, an SD card, a flash memory, and so on as well as the HDD 205 may be used as external storage devices.

A scanner I/F 201 controls input of images from a scanner unit 215. A printer I/F 207 controls output of images to a printer unit 216. A panel operation I/F 208 controls display on an operation panel 212 and controls input of various types of setting information set on the operation panel 212. An image input I/F 209 controls input of images from an image input device 213 such as a camera. An audio input-output I/F 210 controls input and output of audio from and to an audio input-output device 214 such as a headset. A network I/F 211 carries out data communications with an external network via a network cable.

Figure 3:
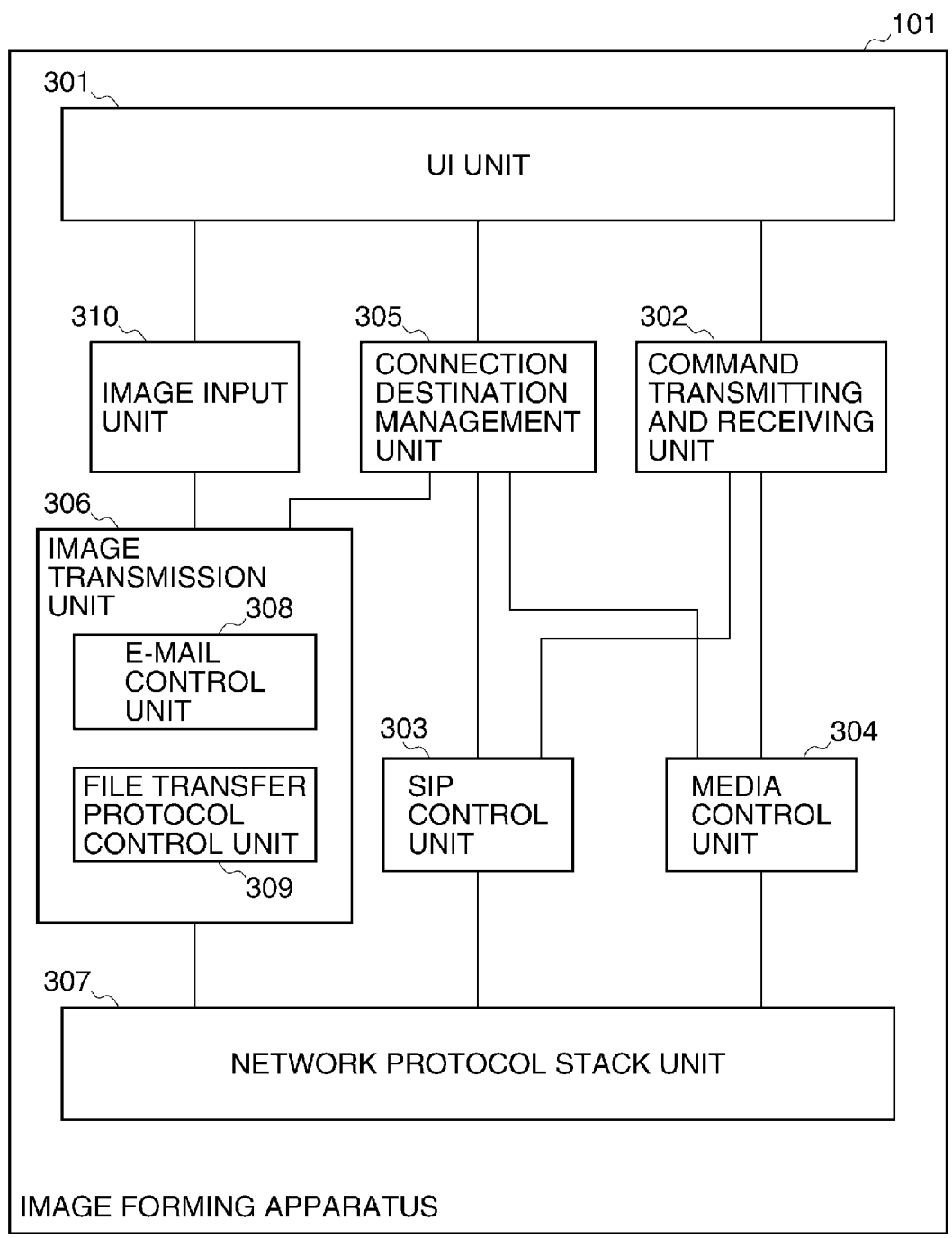
FIG. 3 is a block diagram schematically showing a software arrangement of the image forming apparatus.

FIG. 3 is a block diagram schematically showing a software arrangement of the image forming apparatus 101.

Referring to FIG. 3, a UI unit 301, a command transmitting and receiving unit 302, a SIP control unit 303, a media control unit 304, a connection destination management unit 305, an image transmission unit 306, a network protocol stack unit 307, and an image input unit 310 are stored as programs in the HDD 205. They are loaded into the RAM 204 and executed by the CPU 202.

By way of the panel operation I/F 208, the UI unit 301 controls display on the operation panel 212 and input of various types of setting information set on the operation panel 212. The command transmitting and receiving unit 302 transmits and receives commands for carrying out processes to and from the UI unit 301, the SIP control unit 303, and the connection destination management unit 305.

The SIP control unit 303 controls SIP sessions. The media control unit 304 transmits and receives media data such as audio and images, and as the need arises, inputs and outputs audio and image data via the audio input-output I/F 210, the panel operation I/F 208, and the image input I/F 209. The connection destination management unit 305 manages an IP address of the SIP proxy 103 and a SIP URI of the call center for connecting to the PC 102.

The image transmission unit 306, which is comprised of an E-mail control unit 308 and a file transfer protocol control unit 309, provides control to transmit and receive image data, which is input from the image input unit 310, to and from an external host via the network protocol stack unit 307. The network protocol stack unit 307 controls network communication with the external host using IP. The image input unit 310 provides control to transfer image data which is input from the scanner unit 215, or image data which is stored as BOX data in the HDD 205, to the image transmission unit 306.

Figure 4:
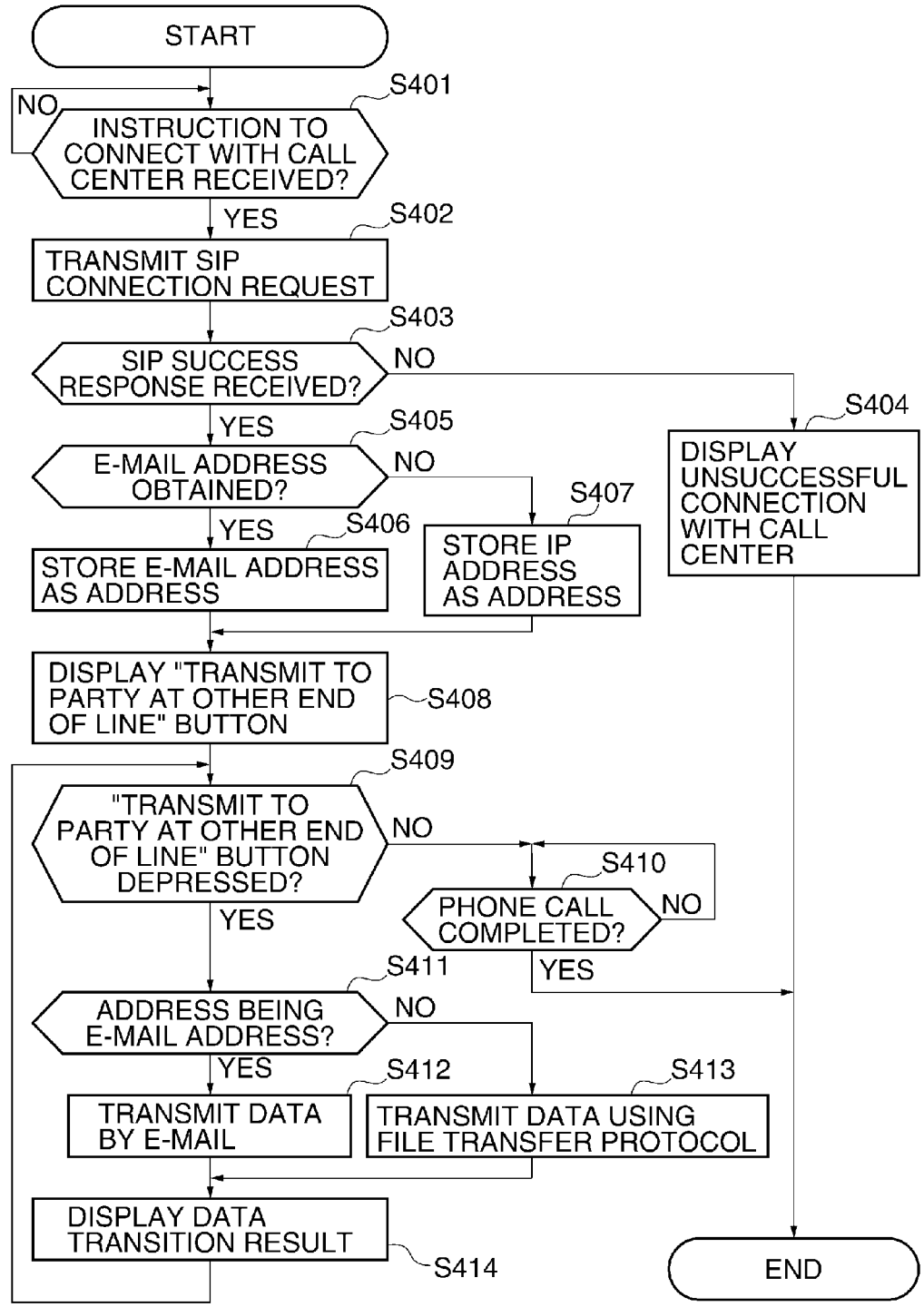
FIG. 4 is a flowchart showing the flow of a process in which the image forming apparatus carries out a communication with a PC.

FIG. 4 is a flowchart showing the flow of a process in which the image forming apparatus 101 carries out a communication with the PC 102. This process is realized by the CPU 202 executing a program stored in the HDD 205 and loaded into the RAM 204.

In step S401, when the command transmitting and receiving unit 302 receives an instruction to connect with a call center from the UI unit 301, the CPU 202 obtains a SIP URI of the call center and an IP address of a SIP proxy. The CPU 202 then instructs the SIP control unit 303 to establish a SIP session with the PC 102. The instruction to connect with the call center is issued by, for example, depressing a call center button, not shown, displayed on the UI unit 301, but the connection method should not limited to this.

Then, in step S402, the SIP control unit 303 transmits an Invite request, which is addressed to the call center SIP URI, to the IP address of the SIP proxy 103 via the network I/F 211. The SIP proxy 103 carries out a process to establish a SIP session with the PC 102 via the FW 105, the network 109, and the FW 106.

Then, in step S403, the SIP control unit 303 determines whether or not it has received a success response as shown in FIG. 8 in response to the Invite request. When a success response (SIP response) has not been received, and no SIP session has been established, the CPU 202 notifies a user of unsuccessful communication by providing an indication to that effect on the UI unit 301 (step S404). On the other hand, when a SIP response has been received, the CPU 202 proceeds to step S405.

By using the established SIP session, the image forming apparatus 101 and the PC 102 can perform two-way communications without being aware of FWs. Upon establishing the SIP session, the SIP control unit 303 notifies the media control unit 304 to that effect. The media control unit 304 activates an audio input-output function of the audio input-output device 214 via the audio input-output I/F 210. Then, on the SIP session established in the step S403, the media control unit 304 transmits and receives audio data to and from the PC 102.

In the step S405, the connection destination management unit 305 determines whether or not an E-mail address of the PC 102 can be obtained from the received SIP response. When the E-mail address is included in the SIP response, this is written in a line E of a SDP (session description protocol) part. Whether or not to store the line E in a SIP response is arbitrarily determined, and hence depending on the SIP response, there may be a case where the line E is stored in the SDP part and a case where the line E is not stored in the SDP part. Thus, as shown in FIG. 8, when the line E is stored in the SDP part, the CPU 202 proceeds to step S406. On the other hand, when the line E is not stored in the SDP part, the CPU 202 proceeds to step S407.

In the step S406, the connection destination management unit 305 temporarily stores the E-mail address of the PC 102 as destination information in the RAM 204.

In the step S407, the connection destination management unit 305 obtains an IP address of the PC 102 from a line C in the SDP part and temporarily stores the IP address as destination information in the RAM 204.

Figure 7:
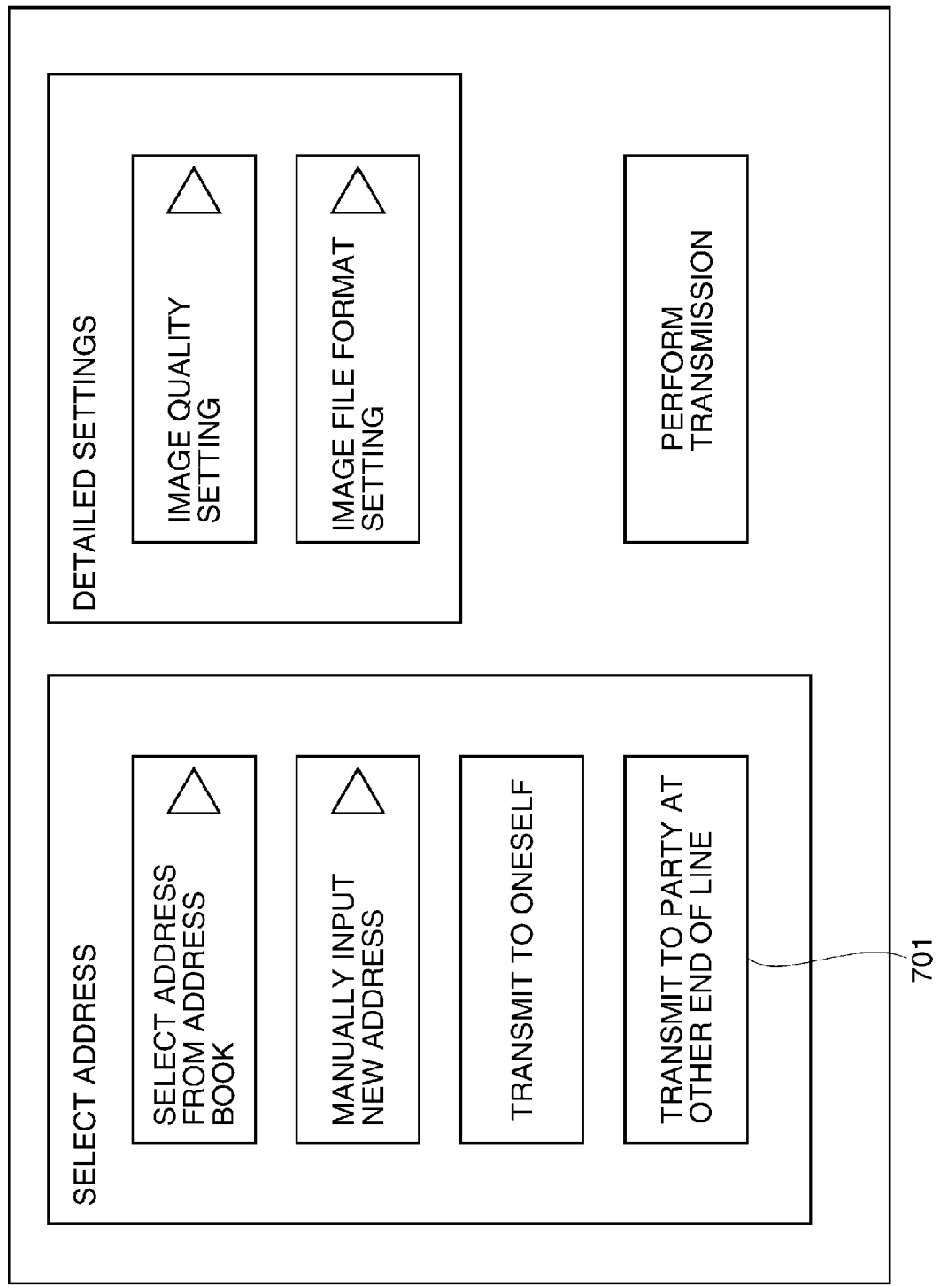
FIG. 7 is a view showing an exemplary UI on which an operation key button, which enables one-touch transmission of image data to the PC, is displayed.

In the step S406 or the step S407, when the E-mail address or the IP address of the PC 102 can be obtained, the connection destination management unit 305 notifies the UI unit 301 to that effect. The UI unit 301 displays an operation key button which enables one-touch transmission of image data to the PC 102 (step S408). The UI unit 301 provides a "TRANSMIT TO PARTY AT OTHER END OF LINE" button 701 as shown in FIG. 7 as the operation key button which enables one-touch transmission of image data to the PC 102.

When the need to transmit arbitrary image data to the PC 102 arises during a phone call by a user after the "TRANSMIT TO PARTY AT OTHER END OF LINE" button 701 is displayed on the UI unit 301, the user scans image data or scans image data to Box and depresses the "TRANSMIT TO PARTY AT OTHER END OF LINE" button 701. When the UI unit 301 recognizes the depression of the "TRANSMIT TO PARTY AT OTHER END OF LINE" button 701 (YES in step S409), the CPU 202 proceeds to step S411.

Figure 5:
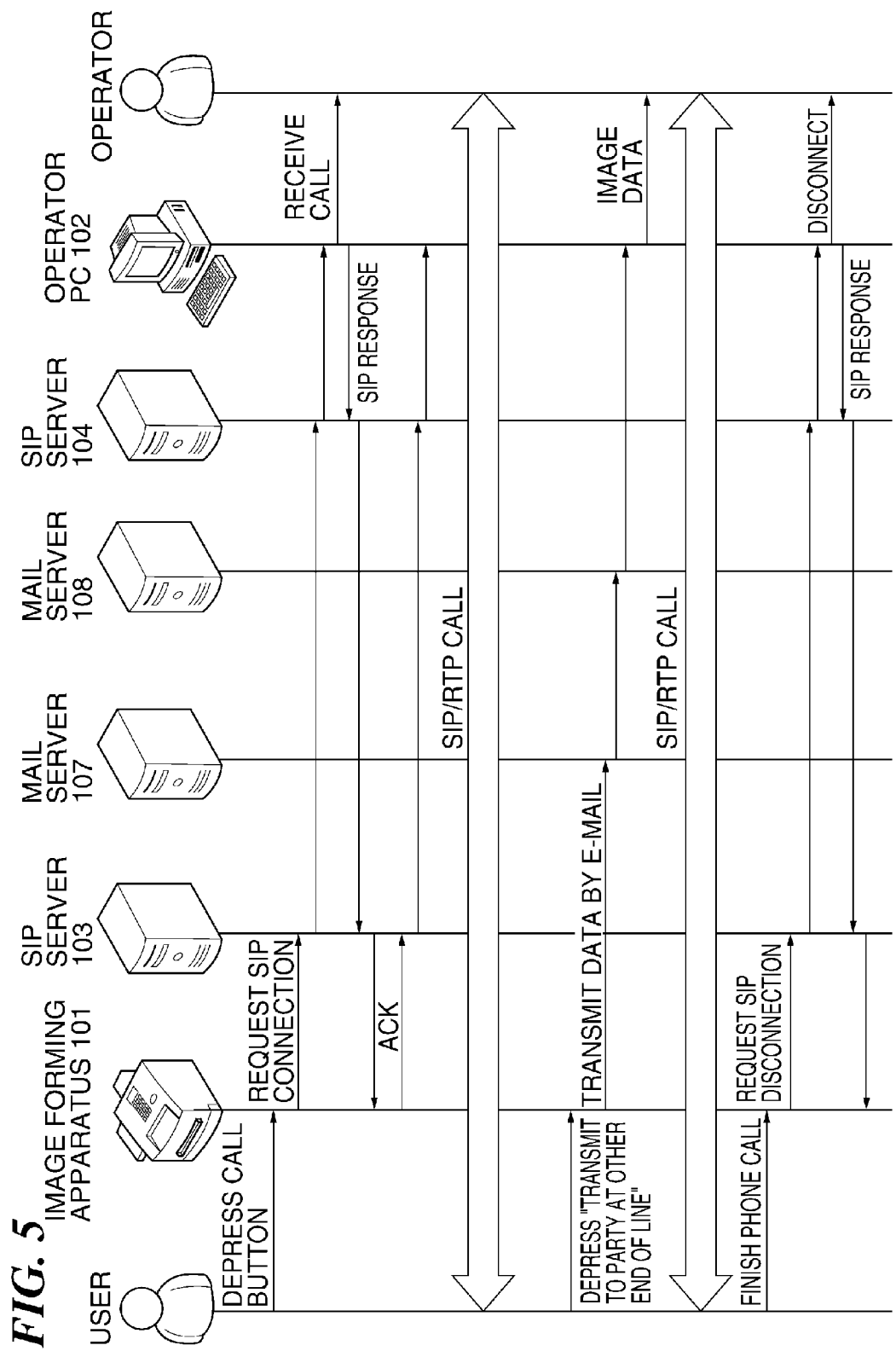
FIG. 5 is a sequence diagram showing data transmission by E-mail, which is carried out in step S412 in FIG. 4.

In the step S411, the connection destination management unit 305 refers to the destination information temporarily stored in the RAM 204 and determines whether the address of the PC 102 is an E-mail address or an IP address. When it is determined that the address of the PC 102 is an E-mail address, the E-mail control unit 303 designates the E-mail address of the PC 102 as a destination of an E-mail, attaches input image data to the E-mail, and carries out transmission of the E-mail (step S412). A sequence on this occasion is shown in FIG. 5.

Figure 6:
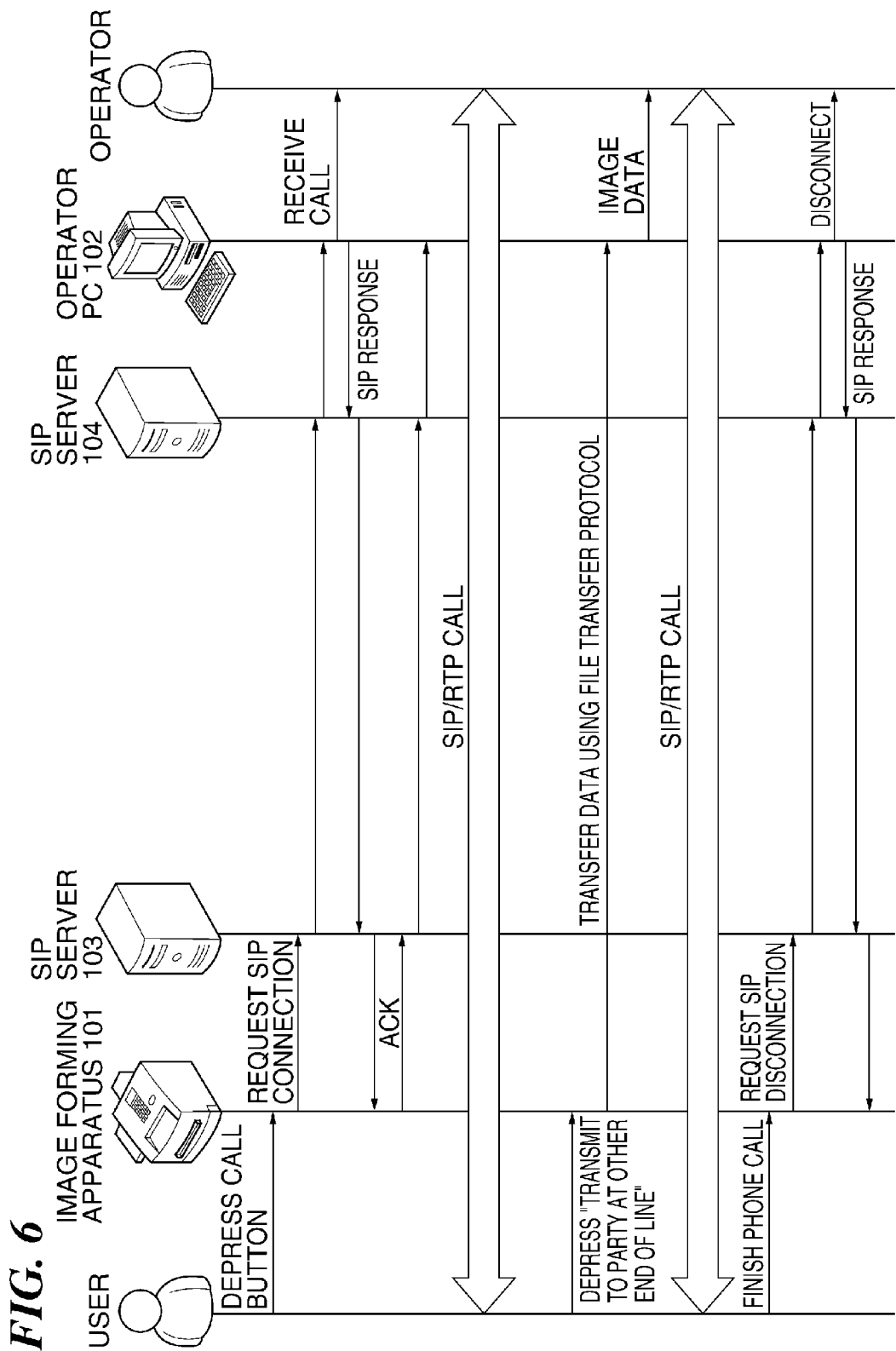
FIG. 6 is a sequence diagram showing data transmission using a file transfer protocol, which is carried out in step S413 in FIG. 4.

On the other hand, when the connection destination management unit 305 determines that the address of the PC 102 is an IP address, the file transfer protocol control unit 309 carries out file transfer to the IP address using a file transfer protocol set in advance (step S413). Examples of the file transfer protocol include FTP (File Transport Protocol) and SMB (Server Message Block). Also, WebDAV (Web-based Distributed Authoring and Versioning) or the like may be designated. A sequence on this occasion is shown in FIG. 6.

When transmission of image data using any of the above methods is completed, the CPU 202 displays the transmission result on the UI unit 301 (step S414) and returns to the step S409.

In the step S409, when it is unnecessary to transmit the image data, the CPU 202 proceeds to the step S410, in which it waits until a phone call to the PC 102 is finished.

Figure 9:
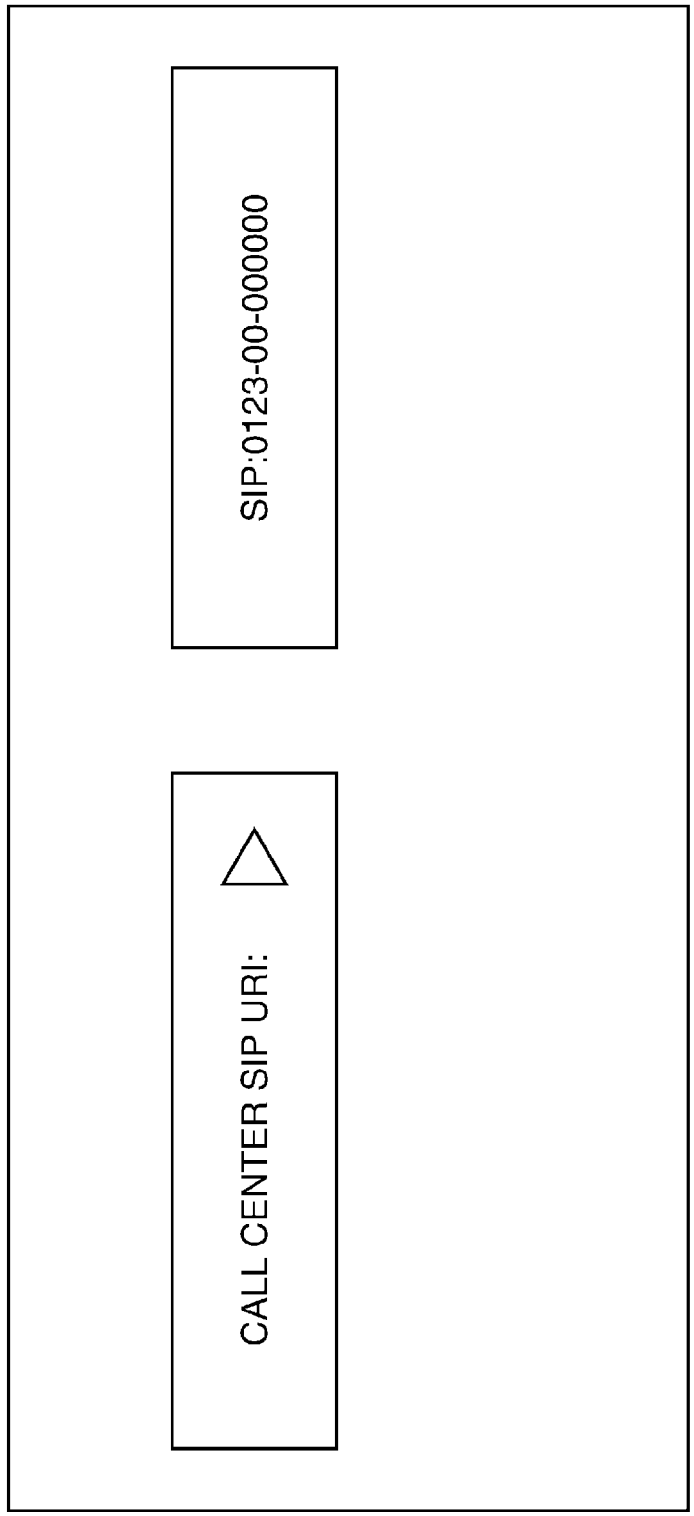
FIG. 9 is a view showing an exemplary call center SIP URI setting screen.

FIG. 9 is a view showing an exemplary call center SIP URI setting screen.

An administrator of the image forming apparatus 101 sets a call center SIP URI in advance via the screen shown in the figure. When a call center button, not shown, is depressed, the connection destination management unit 305 transmits a SIP request to a SIP URI set on this screen. By displaying this screen in, for example, a UI area that cannot be operated by a user but can be operated only by a specific administrator, the SIP URI of the call center SIP URI can be prevented from being given to the user, and leakage of the information can be prevented.

According to the embodiment described above, even in the case of, for example, transmitting image data to the party at the other end of the line who is making a phone call over IP telephony, a user can transmit the image data to the party at the other end of the line by one key operation without input of an address using a character, a number, a symbol and so on or selection of an address by searching an address book.

Moreover, because destination information on the party at the other end of the line is obtained during communication for a media negotiation, wrong transmission of image data can be prevented. Furthermore, because it is unnecessary to notify a user, who is a customer, of destination information on the party at the other end of the line, leakage of the destination information on the party at the other end of the line is unlikely to occur.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-270260 filed Dec. 11, 2012, which is hereby incorporated by reference herein in its entirety.

What is claimed is:

1. An image forming apparatus comprising:
a storage device; and
a processor configured to execute computer executable instructions recorded on the storage device, the computer executable instructions including instructions, that when executed by the processor, cause the image forming apparatus to:
establish a communication with an external apparatus using a call control protocol and first destination information of the external apparatus;
obtain, during the established communication with the external apparatus, second destination information of the external apparatus from the external apparatus, the second destination information being different from the first destination information; and
display an operation key which enables data transmission to the obtained second destination information of the external apparatus without manual input of the second destination information by a user.

2. The image forming apparatus according to claim 1, wherein the computer executable instructions further include instructions, that when executed by the processor, cause the image forming apparatus to transmit, according to depression of the displayed operation key, the data using the obtained second destination information of the external apparatus.

3. The image forming apparatus according to claim 2, wherein the image forming apparatus is caused to transmit an E-mail with the data attached thereto, or transmit the data using a file transfer protocol.

4. The image forming apparatus according to claim 1, wherein the manual input includes input of a character, a number and a symbol and selection of an address.

5. A control method for an image forming apparatus, comprising:
establishing a communication with an external apparatus using a call control protocol and first destination information of the external apparatus;
obtaining, during the established communication with the external apparatus, second destination information of the external apparatus from the external apparatus, the second destination information being different from the first destination information; and
displaying an operation key which enables data transmission to the obtained second destination information of the external apparatus without manual input of the second destination information by a user.

6. A non-transitory computer-readable storage medium storing a program for causing a computer to execute a control method for an image forming apparatus, the control method comprising:
establishing a communication with an external apparatus using a call control protocol and first destination information of the external apparatus;
obtaining, during the established communication with the external apparatus, second destination information of the external apparatus from the external apparatus, the second destination information being different from the first destination information; and
displaying an operation key which enables data transmission to the obtained second destination information of the external apparatus without manual input of the second destination information by a user.

7. The image forming apparatus according to claim 1, wherein the operation key enables data transmission to the external apparatus during the established communication.

8. A communication apparatus comprising:
a storage device; and
a processor configured to execute computer executable instructions recorded on the storage device, the computer executable instructions including instructions, that when executed by the processor, cause the communication apparatus to:
transmit a connection request to an external apparatus using a call control protocol and first destination information of the external apparatus;
receive, from the external apparatus, a response to the connection request;
establish a communication with the external apparatus according to reception of the response;
obtain during the established communication second destination information of the external apparatus included in the response from the external apparatus, the second destination information being different from the first destination information; and
display an operation key which enables data transmission to the obtained second destination information without manual input of the second destination information by a user.

9. The communication apparatus according to claim 8, wherein the computer executable instructions further include instructions, that when executed by the processor, cause the communication apparatus to transmit, according to depression of the displayed operation key, the data to the obtained second destination information.

10. The Communication apparatus according to claim 8, wherein the second destination information is an E-mail address.

11. The communication apparatus according to claim 8, wherein the second destination information is an IP address.

12. The communication apparatus according to claim 9, wherein the communication apparatus is caused to transmit an E-mail with the data attached thereto.

13. The communication apparatus according to claim 9, wherein the communication apparatus is caused to transmit the data using a file transfer protocol.

14. The communication apparatus according to claim 13, wherein the file transfer protocol is one of FTP (File Transport Protocol) and SMB (Server Message Block), and WebDAV (Web-Based Distributed Authoring and Versioning).

15. The communication apparatus according to claim 8, wherein the manual input includes input of a character, a number and a symbol and selection of an address.

16. The communication apparatus according to claim 8, wherein the operation key enables data transmission to the external apparatus during the established communication.

17. The communication apparatus according to claim 8, wherein the call control protocol is SIP (Session Initiation Protocol).

18. The communication apparatus according to claim 9, wherein the computer executable instructions further include instructions, that when executed by the processor, cause the communication apparatus to scan an image on a document, generate an image data, and transmit the generated image data.

19. The communication apparatus according to claim 18, wherein the communication apparatus is caused to transmit an E-mail with the generated image data attached thereto.

20. The communication apparatus according to claim 18, wherein the computer executable instructions further include instructions, that when executed by the processor, cause the communication apparatus to store an image data and transmit the stored image data.

21. The communication apparatus according to claim 20, wherein the communication apparatus is caused to transmit an E-mail with the stored image data attached thereto.

22. A control method for a communication apparatus, comprising:
   transmitting a connection request to an external apparatus using a call control protocol and first destination information of the external apparatus;
   receiving, from the external apparatus, a response to the connection request;
   establishing a communication with the external apparatus according to reception of the response;
   obtaining during the established communication second destination information of the external apparatus included in the response from the external apparatus, the second destination information being different from the first destination information; and
   displaying an operation key which enables data transmission to the obtained second destination information without manual input of the second destination information by a user.

23. A non-transitory computer-readable storage medium storing a program for causing a computer to execute a control method for a communication apparatus, the control method comprising:
   transmitting a connection request to an external apparatus using a call control protocol and first destination information of the external apparatus;
   receiving, from the external apparatus, a response to the connection request;
   establishing a communication with the external apparatus according to reception of the response;
   obtaining second destination information of the external apparatus included in the response from the external apparatus, the second destination information being different from the first destination information; and
   displaying an operation key which enables data transmission to the obtained second destination information without manual input of the second destination information by a user.

24. The image forming apparatus according to claim 1, wherein the image forming apparatus is caused to display the operation key which enables data transmission to the obtained second destination information of the external apparatus without displaying the obtained second destination information.

25. The communication apparatus according to claim 8, wherein the communication apparatus is caused to display the operation key which enables data transmission to the obtained second destination information of the external apparatus without displaying the obtained second destination information.

* * * * *